United States Patent [19]

Moore

[11] Patent Number: 4,680,067

[45] Date of Patent: Jul. 14, 1987

[54] METHOD AND ARRANGEMENT FOR ATTACHING PRINTING PLATES TO A PLATE CYLINDER

[75] Inventor: John Moore, La Conversion, Switzerland

[73] Assignee: De la Rue Giori S.A., Lausanne, Switzerland

[21] Appl. No.: 870,441

[22] Filed: Jun. 4, 1986

[30] Foreign Application Priority Data

Jul. 26, 1985 [CH] Switzerland ........................ 3258/85

[51] Int. Cl.[4] ........................ B32B 31/12; B32B 31/20; B41F 13/08

[52] U.S. Cl. ...................................... 156/165; 29/523; 29/530; 100/212; 101/378; 156/150; 156/304.2; 156/311; 156/560; 156/583.3; 219/9.5; 219/10.53

[58] Field of Search ............... 156/165, 215, 311, 475, 156/560, 580, 583.3, 150, 304.2; 100/212, 93 PB; 29/33 B, 233, 524, 530, 523; 101/375, 378; 219/10.53, 9.5, 76.1, 101; 204/14.1, 15

[56] References Cited

U.S. PATENT DOCUMENTS

| | | | |
|---|---|---|---|
| 2,948,327 | 8/1960 | Horner | 156/475 |
| 3,288,982 | 11/1966 | Suzuki et al. | 219/9.5 |
| 4,025,600 | 5/1977 | Parr | 156/304.2 |
| 4,104,961 | 8/1978 | Morgan, Jr. | 100/93 PB |
| 4,224,095 | 9/1980 | Giori | 156/228 |
| 4,515,375 | 5/1985 | Bleckmann et al. | 277/1 |

*Primary Examiner*—Michael Wityshyn
*Assistant Examiner*—Lori Simmons
*Attorney, Agent, or Firm*—Kane, Dalsimer, Kane, Sullivan and Kurucz

[57] ABSTRACT

Two intaglio printing plates having a total length equal to the circumference of the cylindrical barrel (1) of a plate cylinder are prepared. The cylindrical barrel (1) is expanded radially, and on the portion of its surface corresponding to the first plate (4) to be attached an epoxy film is deposited. The first plate (4) is applied on the epoxy film in the exact position. On the remaining part of the cylindrical barrel (1) one or a plurality of metal sheets (5) are deposited for ensuring the continuity of the cylinder surface. The plate (4) to be attached is surrounded by a tightening ribbon (6) covering completely the plate (4). Heat is used for softening the epoxy film and the ribbon (16) is tightened by exerting tractive forces beginning from the center of the two ends of the ribbon and advancing towards the peripheral edges. The epoxy film is allowed to set, the ribbon (6) and the sheet or sheets (5) are removed. A film of epoxy is applied to the cylinder surface corresponding to the second plate to be attached and the same procedure as before is carried out.

8 Claims, 2 Drawing Figures

METHOD AND ARRANGEMENT FOR ATTACHING PRINTING PLATES TO A PLATE CYLINDER

FIELD OF INVENTION

The present invention relates to a method and an arrangement for attaching intaglio printing plates to a plate cylinder of a web fed intaglio printing machine.

A plate cylinder for a web fed intaglio printing process must necessarily meet various strict requirements warranting on the one hand the sharpness of the impression and on the other hand the perfect registration between the various images. The main requirements are as follows:

1. The peripheral surface of the plate cylinder must be continuous that is, without any groove between the plates, to avoid shocks on this surface as a consequence of the very high pressures to which the cylinder is exposed during the wiping and printing steps, which are likely to bring about deformations in the cylinder surface, notably as a consequence of the tangential efforts due to the rolling of two cylinders in mutual contact.
2. A perfect concentricity of the cylinder for on the one hand ensuring a perfect wiping after inking and on the other hand avoiding the exertion of an irregular pressure on the plate cylinder during the printing or wiping steps, which would tend to alter the shape of the cylindrical barrel during these steps.
3. The outer diameter of the cylinder should be constant throughout the cylinder length so as to warrant a perfect registration.
4. The possibility of using the cylindrical barrel by attaching other printing plates thereto, because, since its inner wall is slightly tapered in order to perfectly match the corresponding tapered configuration of the machine shaft to which it is attached during the printing, the manufacture of this barrel requires an extremely accurate machining and its manufacturing cost is very high.

PRIOR ART

A manufacturing method is proposed in the U.S. Pat. No. 4,224,095 which consists in fixing to the cylindrical barrel surface previously coated with a film of glue the curved printing plates, thus avoiding any break of continuity. For this purpose a cylindrical hollow mold consisting of at least two shells and having an inner diameter matching the outer diameter of the plate cylinder to be obtained is provided. An engraved plate is disposed inside the first shell, and then the second plate and subsequently the second shell are disposed on the barrel. The assembly is then heated to soften the glue and the cylindrical barrel is expanded radially so that the printing plates are pressed against the mold, the glue is allowed to harden and the plate cylinder is stripped. The radial expansion is obtained by introducing an expansion cone into the tapered wall of the cylindrical barrel.

This method constitutes an interesting alternative to the hitherto known methods, notably the production of a printing plate by the so-called transfer method, i.e. by transferring by rolling a cylinder provided with a contour corresponding to the plate to the cylindrical barrel, or still by galvanic processes. However, these methods are still relatively expensive, because the preparation of the external mold requires a high-precision workmanship since the inner diameter of the mold must match perfectly the outer diameter of the plate cylinder when the latter is fitted to the shaft of the printing machine. On the other hand it is extremely difficult to cut plates in a manner excluding any break of continuity in the peripheral surface of the plate cylinder after the gluing of the two engraved plates.

SUMMARY OF THE INVENTION

The present invention permits of palliating these inconveniences by providing a method of attaching intaglio printing plates to a plate cylinder of a web fed printing machine, which method is on the one hand simpler and less expensive than known methods and on the other hand permits of warranting the continuity of the peripheral surface of the plate cylinder.

The method according to the invention makes use of a cylindrical barrel of ductile material, preferably steel, having a slightly tapered inner wall, and comprises the following steps:

(a) at least two intaglio printing plates having a total length equal to the circumference of the cylindrical barrel are prepared and bent;

(b) the cylindrical barrel is expanded radially within the limits of elastic deformation by using mechanical means so that the outer diameter of the cylinder after fixing the plates is equal to the diameter it should have in the printing machine;

(c) a layer of adhesive substance is applied to one portion of the cylindrical barrel which corresponds to the dimensions of a plate, but of which the length in the peripheral direction is preferably slightly greater than the length of a plate;

(d) one of the printing plates is placed on the cylindrical barrel coated with the adhesive substance, while positioning and holding said one plate in the precise position it should have on the cylindrical barrel;

(e) on the cylindrical barrel and next to the two edges of the printing plate which are parallel to the axis of the cylindrical barrel, there is disposed at least one sheet, preferably a single sheet, having the same thickness and width as the printing plate, and a hardness close to, i.e. about the same as, that of said plate, and of the same length as the peripheral length of the noncovered surface of the cylindrical barrel for preserving the continuity of the cylindrical barrel surface beyond the portion covered with the printing plate;

(f) a tightening ribbon, notably of steel, is disposed around the printing plate so as to cover this plate completely, the length of said ribbon being greater than that of said plate, so that it will also cover the sheet or sheets at least in the vicinity of the two transverse edges of the plate, the areas of the two ends of the ribbon being tangential to the plate cylinder;

(g) after softening the adhesive substance, for example by heating, tractive forces are exerted at spaced intervals on the two ends of the ribbon in directions orthogonal to the cylinder axis, by beginning from points located at the centers of the respective ends and advancing symmetrically towards the lateral peripheral edges, so that the excess of adhesive substance will be forced towards said lateral peripheral edges of said cylindrical barrel (h) when the adhesive substance has set, the ribbon and the sheet or sheets is or are removed, then a layer of adhesive substance is applied to another portion of the cylindrical barrel which corresponds to the dimensions of the second printing plate, this second printing plate is applied thereto, if necessary one or more sheets are disposed as before in the portion of the cylinder surface not covered by the plates, the second printing plate is covered with the ribbon like the first one, and tractive forces are exerted as in the preceding step until the adhesive substance has set, whereafter the ribbon is removed;

(i) the last step is repeated, if necessary, until the complete printing surface of the plate cylinder is covered;

(j) the grooves formed between the adjacent plates are filled up and the areas of these filled grooves are machines to provide an unbroken peripheral surface;

(k) the application of forces causing the expansion of the cylindrical barrel is discontinued so that the barrel will resume its initial dimensions.

The advantages of this method are as follows, with reference to the case in which the cylinder is to be provided with two plates:

The plates are prepared beforehand by using the conventional and therefore low-cost methods, and more particularly the two edges of the plates, which are to be disposed parallel to the cylinder axis, are cut accurately so that the plate length corresponds exactly to the half-circumference of the cylindrical barrel and that said edges be straight and regular. During the gluing operation, possible errors in the outer diameter of the plate cylinder may be compensated by using a more or less thick printing plate. The sheet, which may be a second plate or in any case a plate of same size and same material as the first plate but non-engraved, or two, or even several sheets following the two edges of the first plate, permit of avoiding any sudden change in the surface exposed to the pressure exerted by the ribbon. An abrupt change would be attended by a concentration of the effort at this location, and therefore by a deformation of the plate edges which would develop irregularities in the peripheral surface of the cylinder. As the pressure exerted on the plate is uniform throughout its surface, a perfect adherence of the plate is obtained, while avoiding possible deformation likely to arise as a consequence of a non-uniform pressure exerted during the gluing operation. By exerting tractive efforts beginning at the centers of the respective ends of the ribbon and progressing axially toward the peripheral edges of the cylinder, the excess of glue is driven outwards and thus cannot accumulate under certain areas of the plate, thus preventing the development of deformations in the cylinder surface. The fact that the cylindrical barrel is expanded radially exactly at it will expand when the cylinder is mounted on the shaft of the printing machine, permits of warranting accurately the matching with the outer diamter of the plate cylinder in its operative position. By filling the groove formed between the adjacent edges of the two plates and the machining thereof, a perfect continuity of the peripheral surface of the plate cylinder is achieved. Finally, after the printing the cylindrical barrel can be re-used since it is possible to strip off the plates, grind the outer surface of the cylindrical barrel and glue new plates bearing other designs. The possible reduction of the diameter of the cylindrical barrel as a consequence of this grinding step may be compensated by using thicker plates.

The grooves between the adjacent edges of two plates may be filled in various ways:

If the design printed on the web is not continuous across two joints separating the two plates, these grooves must be filled with epoxy glue, and when the latter has set, the surface must be ground in order to obtain a substantially unbroken surface.

If on the other hand the design is continuous across two joints, the surface must necessarily be perfectly continuous in these areas. In this case, two methods may be used in principle:

The two grooves are filled with the same material as the plates, usually nickel, by laser welding or electrodeposition, Or the grooves are made dimensionally uniform, for example by milling, whereafter a strip of the same material as the plates, usually nickel, having dimensions matching the groove dimensions is inserted into these grooves.

After fixing the plates and grinding the joints of the two plates, a chromium coating is deposited on the entire surface of the plate cylinder, for example by dipping the cylinder previously removed from the shaft into an electrolytic bath.

The invention is also concerned with an exemplary arrangement for carrying out the method.

The invention will not be described more in detail with reference to be attached drawing illustrating diagrammatically one portion of the means for carrying out the method.

DESCRIPTION OF THE PREFERRED EMBODIMENTS

Figure 1:
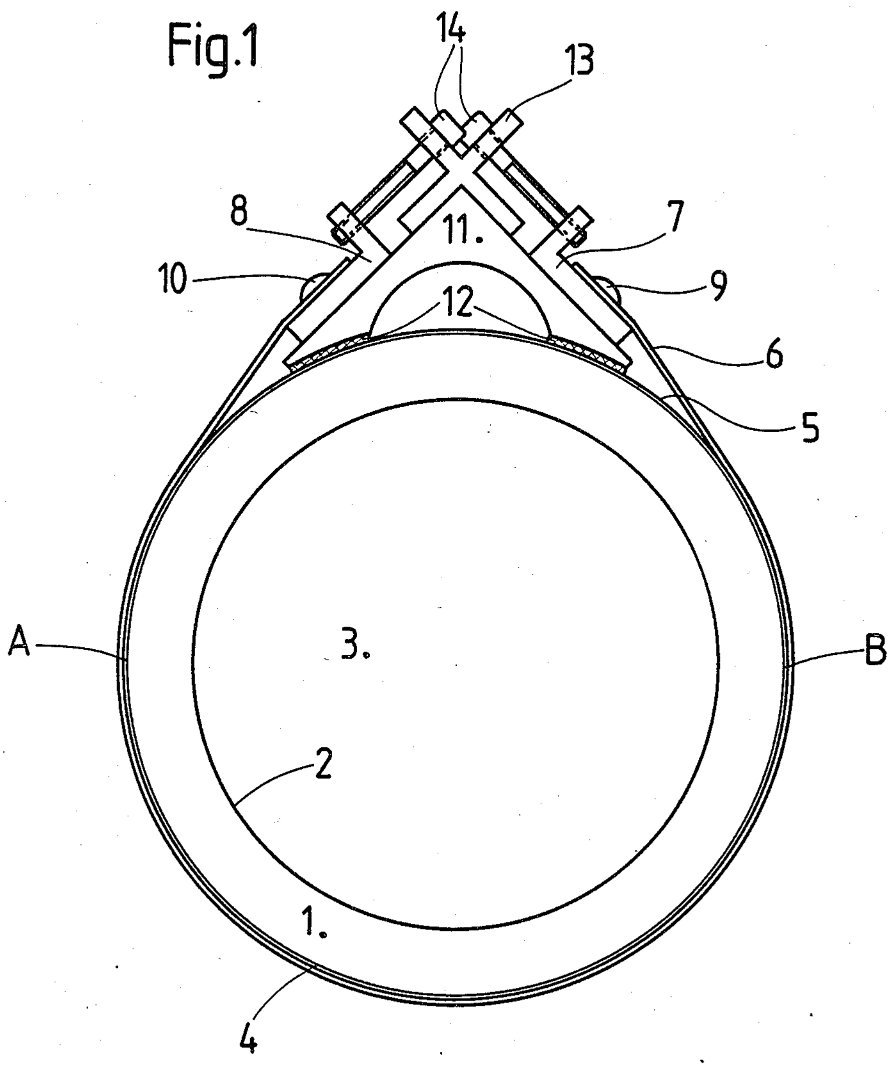
FIG. 1 is a radial sectional view of the plate cylinder with the ribbon and the traction device.
Figure 2:
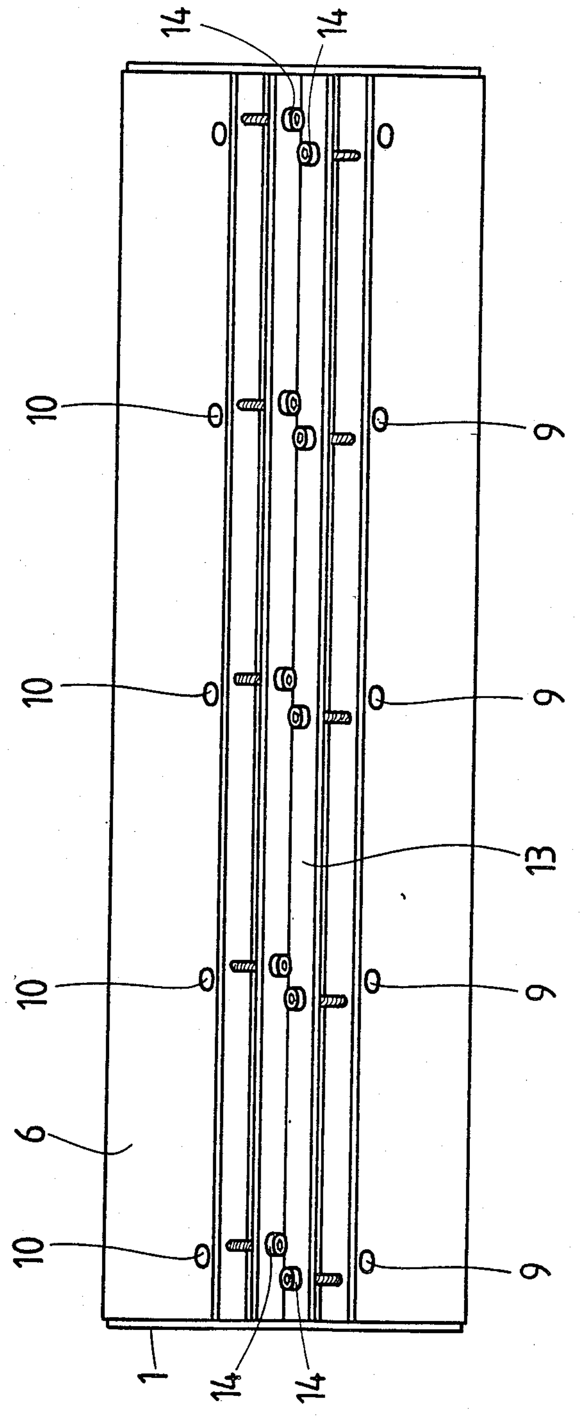
FIG. 2 is a plane view of the above-defined object.

The example describes related to a two-plate cylinder. A plate cylinder comprising a cylindrical barrel 1 having a slightly tapered inner wall is prepared according to conventional methods. The intaglio printing plates are prepared also by means of conventional methods by engraving on two nickel plates the image to be printed on the web. Subsequently, the two plates are bent by causing them to pass between a set of rollers, their radius corresponding to that of the cylinder, the plates are cut with precision in both traverse and longitudinal directions to match the length and the outer half-circumference, respectively, of the cylindrical barrel. The cylindrical barrel 1 is fitted on a shaft 3 having a taper corresponding to that of the inner wall 2 of the cylindrical barrel. The barrel 1 is thrust to cause a radial expansion corresponding to that to be exerted on the plate cylinder when the latter is fitted on the shaft of the printing machine. The expansion corresponds to an increment of about 0.2 mm of the cylinder diameter.

Then, a layer of glue, notably an epoxy glue film, is deposited on one-half of the surface, in the peripheral direction, of the barrel, this film covering in fact slightly more than half the cylinder surface for reasons to be explained hereinafter. On the surface coated with the epoxy film the first plate 4 is disposed and positioned with precision on the cylindrical barrel, so that its two edges be perfectly parallel to the cylinder axis, as well as its axial position in relation to the cylindrical barrel. To obtain this adjustment and keep the plate 4 in this position one may, for instance, use two rings screwed on shaft 3 on either side of the cylindrical barrel 1 and having a diameter greater than that of the barrel, said rings may be provided with pins protruding axially towards the cylindrical barrel for maintaining axially the printing plate 4. In principle these pins cooperate with notches formed for this purpose on the bent edges of plate 4.

When the plate 4 is properly positioned it can be locked in this position by means of two rivets which can be inserted in the vicinity of the bent edges of the plate and cooperate with two corresponding holes formed in the cylindrical barrel 1.

Next, a sheet, formed by a second plate 5 which is on principle ungraved and has exactly the same dimensions as the second intaglio plate to be set later on, is disposed after the engraved plate 4 and on the second half of the cylindrical barrel, so that the peripheral surface of the plate cylinder is continuous. The second plate 5 is held in position by temporary means that may be, apart from the above-mentioned pins, the gravity by rotating the shaft 3 so that this second plate 5 will be located on the upper half of the cylinder.

Then the first plate 4 is surrounded by a steel ribbon 6 having a width equal to the length of the plate cylinder and a length greater than the half-circumference of the plate cylinder.

The two ends of ribbon 6 are provided with two L-section elements 7 and 8. The ribbon edges are attached to one of the wings of these section elements by means of screws 9 and 10, respectively. The second wings of section elements 7, 8 are provided with tapped holes.

A pressure member 11 engages the second plate 5 with a cylindrical concave surface lined with soft material 12 to protect the surface of plate 5 from damages. On top of the pressure member 11 is a member 13 having a cross-shaped cross-section. This member 13 may be secured to pressure member 11 by welding or screwing, or simply laid as shown in the Figure. The two arms of the cross-shaped member 13 extending beyond the pressure member 11 are provided with holes for receiving bolts 14 adapted to engage the tapped holes of section elements 7 and 8. Thus, when the bolts 14 are rotated they move in or out from the tapped holes so that the tractive forces exerted on ribbon 6 can be increased or decreased.

Before exerting these tractive forces, the glue film interposed between the plate 4 and cylindrical barrel 1 is heated, for example by heating the shaft 3. When the glue has softened enough, the ribbon 6 is tightened by actuating the bolts 14. Firstly, the bolts located in the central area of member 13 are tightened, and the tightening is continued by actuating the bolts symmetrically from the center toward the peripheral edges. Thus, the excess glue is expelled towards the peripheral edges and can be removed and more particularly prevented from remaining trapped under the plate 4 and causing a deformation thereof and consequently of the peripheral surface of the plate cylinder. It is definitely essential to point out that along the joints A, B between plates 4 and 5 the peripheral surface of the plate cylinder is unbroken, so that the tractive efforts exerted on the complete plate 4, including its two edges, are uniform. Besides, it is for obtaining this uniformity and preventing a break along the two edges of plate 4 that the glue film is applied beyond one half on the peripheral surface of the cylindrical barrel, so that in the vicinity of joints A and B the surface is definitely continuous, at least as far as its height is concerned.

When the desired tightening is obtained, the glue heating is discontinued and the assembly is cooled either by artificial means or by allowing the assembly to cool down naturally. When this cooling is completed, the ribbon 6 and the members 11, 13 are removed, and the plate 5 is stripped by lifting its two ends near to the joints A and B; a glue film is applied to the second half of the surface of the cylindrical barrel, the second intaglio printing plate is positioned and surrounded by the ribbon 6, and the same procedure as described hereinabove is applied, except that now the pressure member 11 is pressed against the surface of the previously glued intaglio plate 4. When the fixing of the second plate is completed, the ribbon 6 and members 11, 13 are removed.

Subsequently, the grooves between the edges of the two intaglio printing plates are treated as follows:

If the image to be printed on the web during a complete revolution of the cylinder is not continuous, i.e. if gaps appear on the plates in the axial direction, and correspond to paper areas to be cut off and eliminated during the cutting operation, the grooves are filled with an epoxy resin and when this resin has hardened, the surface is machined to obtain a satisfactory continuity of the peripheral surface of the cylinder. Obviously, this solution is resorted to when the areas in which the grooves are located correspond to the paper areas to be eliminated when subsequently cutting the printed web.

If the image to be printed on the web must be strictly continuous, then the peripheral surface of the plate cylinder must be perfectly continuous. In this case, two solutions are basically available: either filling the grooves by electrodeposit or welding, for example with laser, by using the same material as the plates, notably nickel, and then machining the surface until a perfectly unbroken peripheral surface is obtained, or milling or otherwise forming a regular groove, preferably of rectangular cross-section, between the adjacent edges of two plates, and inserting a strip of the same material as the plates, preferably nickel, of a size matching that of the groove, and subsequently machining this area in order to obtain the continuity of the peripheral surface of the cylinder.

Upon completion of the surface grinding step, the plate cylinder is removed from shaft 3 and therefore allowed to shrink back to its initial dimensions. A chromium coat is deposited throughout the peripheral surface of the plate cylinder by dipping the cylinder in an electrolytic bath.

In principle, an 8 to 10 micron chromium layer is deposited on the entire peripheral surface of the plate cylinder.

In should be mentioned that instead of using a second plate 5 when gluing the first intaglio printing plate 4, two sheets disposed next to the two edges of plate 4 may be used, but positioning these sheets is slightly more difficult and it is preferred to use an one-piece plate.

Of course, the above-described traction device is but an exemplary form of embodiment which can be modified without departing from the spirit of the invention.

Similarly, instead of having to fix only two plates on the cylinder, a greater number thereof can be used, for example three, if required by the cylinder diameter, by applying the above-described method and arrangement.

What is claimed is:

1. Method of attaching printing plates to a plate cylinder of a web fed intaglio printing machine, said plate cylinder comprising a cylindrical barrel of ductile material, having a slightly tapered inner wall, comprising the following steps:

(a) at least two intaglio printing plates having a total length equal to the circumference of the cylindrical barrel are prepared and bent;

(b) the cylindrical barrel is expanded radially within the limits of elastic deformation by using mechanical means so that the outer diameter of the cylindrical barrel after fixing the plates is equal to the diameter it should have in the printing machine;

(c) a layer of adhesive substance is applied to one portion of the cylindrical barrel which corresponds to the dimensions of said printing plate, but of which layer the length in the peripheral direction is greater than the length of said printing plate;

(d) one of the printing plates is placed on the cylindrical barrel coated with the adhesive substance, while positioning and holding said one plate in the precise position it should have on the cylindrical barrel;

(e) on the cylindrical barrel and next to the two edges of the printing plate which are parallel to the axis of the cylindrical barrel, there is disposed at least one sheet having the same thickness and width as the printing plate, and a hardness about the same as that of said plate, and of the same length as the peripheral length of the noncovered surface of the cylindrical barrel for preserving the continuity of the cylindrical barrel surface beyond the portion covered with the printing plate;

(f) a tightening ribbon is disposed around the printing plate so as to cover this plate completely, the length of said ribbon being greater than that of said plate, so that it will also cover the sheet or sheets at least in the vicinity of the two transverse edges of the plate, the areas of the two ends of the ribbon being tangential to the plate cylinder;

(g) after softening the adhesive substance tractive forces are exerted at spaced intervals along the two ends of the ribbon in directions orthogonal to the cylindrical barrel axis, by beginning from points located at the centers of the respective ends of the ribbon and advancing symmetrically towards the lateral peripheral edges of the ribbon, so that the excess of adhesive substance will be forced towards said lateral peripheral edges of said cylindrical barrel;

(h) when the adhesive substance has set, the ribbon and the sheet or sheets is or are removed, then a layer of adhesive substance is applied to another portion of the cylindrical barrel which corresponds to the dimensions of the second printing plate, this second printing plate is applied thereto one or more sheets are disposed as before in the portion of the cylinder surface not covered by the plates, the second printing plate is covered with the ribbon like the first printing plate, and tractive forces are exerted as in the preceding step until the adhesive substance has set, whereafter the ribbon is removed;

(i) step (h) is repeated until the entire cylindrical surface of the plate cylinder is covered;

(j) grooves between the adjacent plates are filled up and the areas of these filled grooves are machined to provide an unbroken peripheral surface; and (k) the application of forces causing the expansion of the cylindrical barrel is discontinued.

2. The method of claim 1, wherein the grooves between the plates are filled by electro-deposition with the same material as the printing plates.

3. The method of claim 1, wherein the grooves between the plates are filled by welding with the same material as the printing plates.

4. The method of claim 1, wherein the grooves are milled to accurate dimensions to obtain a rectangular cross-section, and are subsequently filled with a metal strip of the same material as the plates of corresponding dimensions, each strip being secured on both sides by welding.

5. The method of claim 1, wherein the grooves between the plates are filled with an epoxy resin.

6. The method of claim 1, wherein after filling and machining the grooves a chromium coating is applied to the entire printing surface of the plate cylinder.

7. The method of claim 1, wherein the layer of the adhesive substance is a film of an adhesive product.

8. The method of claim 1, wherein the sheet or sheets used consists or consist of the same material as the printing plate.

* * * * *